350-382 SR XR 3,569,988 SEARCH ROOM

United States

[11] 3,569,988

[72] Inventors Uwe Schmidt
Hamburg-Wandsbek;
Karl Joachim Schmidt-Tiedemann,
Rellingen; Simon Duinker, Hamburg,
Bahrenfeld, Germany
[21] Appl. No. 551,604
[22] Filed May 20, 1966
[45] Patented Mar. 9, 1971
[73] Assignee U. S. Philips Corporation
New York, N.Y.
[32] Priority May 22, 1965
[33] Germany
[31] P36864

[54] A LASER COLOR DISPLAY DEVICE UTILIZING DIGITAL DEFLECTORS AND DISPERSION CORRECTION
9 Claims, 9 Drawing Figs.

[52] U.S. Cl. 178/5.4, 250/199
[51] Int. Cl. H04n 9/14, H04b 9/00
[50] Field of Search 178/5.4 (BDP), 6.5, 5.4, 5.2, 7.3 (D), 6, 6.8 (CK); 250/199 (Publ.), 199; 332/7.51; 350/174, 154, 155, 150; 330/4.3, (Inquired)

[56] References Cited
UNITED STATES PATENTS

| | | | |
|---|---|---|---|
| 2,665,335 | 1/1954 | Cahen | 178/6.5 |
| 2,965,706 | 12/1960 | Ridgeway | 178/5.4 |
| 3,303,276 | 2/1967 | Haeff | 178/5.4 |
| 3,393,955 | 7/1968 | Sterzer | 332/7.51 |
| 2,724,737 | 11/1955 | Hogan | 178/5.4 |
| 3,142,720 | 7/1964 | Adams | 88/61 |
| 3,329,474 | 7/1967 | Harris et al. | 178/7.3 |
| 3,355,674 | 11/1967 | Hardy | 330/4.3 |
| 3,423,736 | 1/1969 | Ash et al. | 350/150 |
| 3,435,447 | 3/1969 | Duna et al. | 350/150 |

OTHER REFERENCES

D. J. Hinkein, " Flicker-Free Display Generation," IBM Technical Disclosure Bulletin, Vol. 6, No. 1, p. 109— 110, June 1963.

K. M. Johnson, Microwave Modulation By The Pocket Effect, The Microwave Journal, Aug. 1964, pp. 51.

*Primary Examiner*—Robert L. Griffin
*Assistant Examiner*—John C. Martin
*Attorney*—Frank R. Trifari

ABSTRACT: A laser imaging system employing a laser beam, a series of voltage operable optical deflection cells, a polarizer for controlling the brightness of the image points, and means for correcting color dispersion including a first lens for focussing the beam in a first plane and a magnifying lens for focussing the ray in a further focal plane. Each deflection cell utilizes two independently energized Kerr cells separated by a dielectric, each of which rotates the plane of polarization of the laser beam less than 90°. Also disclosed is apparatus for eliminating flicker during a field-sequential display including an image storage tube.

3569988
OR IN 350/3

INVENTORS
UWE SCHMIDT
KARL J. SCHMIDT-TIEDEMANN
SIMON DUINKER
BY
AGENT

INVENTORS
UWE SCHMIDT
KARL J. SCHMIDT-TIEDEMANN
SIMON DUINKER

BY Frank R. Trifari
AGENT

PATENTED MAR 9 1971

3,569,988

SHEET 3 OF 5

INVENTORS
UWE SCHMIDT
KARL J. SCHMIDT-TIEDEMANN
SIMON DUINKER
BY
Frank R. Trifari
AGENT

INVENTORS
UWE SCHMIDT
KARL J.SCHMIDT-TIEDEMANN
SIMON DUINKER
BY
AGENT

INVENTORS
UWE SCHMIDT
KARL J. SCHMIDT-TIEDEMANN
SIMON DUINKER
BY Frank R. Trifari
AGENT

A LASER COLOR DISPLAY DEVICE UTILIZING DIGITAL DEFLECTORS AND DISPERSION CORRECTION

This invention relates to devices comprising a laser light source and a digitally-controlled deflection device for deflecting the laser ray in two relatively perpendicular directions.

Such a device is known from British Pat. specification No. 994,955.

The present invention underlie the task to produce a television picture by means of a laser ray. In fact, a laser ray has two advantages which render it particularly suitable, in coaction with a digital light deflector, to project a television picture in a plane which is sufficiently bright and has satisfactory definition, because a laser ray first has a very high light intensity and, secondly, is very small in diameter.

A device according to the invention is characterized in that in projects and produces images variable in time and controlled by electrical pulses, by arranging in the path of rays between the laser light source and the deflection device an electrically controllable polarizer for controlling the brightness of the individual image points, a first lens being arranged at the side of emergence of the ray and focusing it in its focal plane, followed by a second magnifying lens which focuses the deflected ray in enlarged size in a further focal plane.

The above-mentioned suitability of the laser ray for producing a television picture in coaction with a digital light deflector may be explained as follows:

The small diameter of the laser ray is in itself a disadvantage for producing a television picture with it. In fact, this diameter is only 1 micron, which is invisible for the human eye. However, when the laser ray is deflected by means of a digital deflection device, the aim is to minimize the dimensions (width and height) of the deflected image. In fact, for deflection in one direction, as will be explained more fully hereinafter, one unit comprising a polarizing switch and a prism is needed to write two image points side by side.

The next unit must deflect the two image points further and thus be able to write $2^2=4$ image points, and so forth.

With 10 units for on it direction thus possible to write $2^{10}=1024$ image points side by side.

When using 10 units for one direction of deflection and 10 units for the other, it is possible to produce an image of 1,024 (horizontal) × 1,1024 (vertical) image points. This means a very satisfactory definition since the ordinary television picture produced with the 625-line system reaches a highest definition of approximately 800 image points in the horizontal direction and 625 image points in the vertical direction.

If, however, 1,024 image points must be written for each direction, this means that with the digital deflection device, the final unit must have a surface area such that 512 image points can be written on it in one direction and 1,024 image points in the other, (the final unit provides for the final digital deflection in the remaining direction for the ultimate display of 1,024 × 1,024 image points). It will be evident that it is desired to minimize the surface area of the final unit as far as possible. This is desirable firstly, because the polarizing switches (Kerr- or Pockel-cells) and also the prisms are expensive and these elements, especially the prisms, are cheaper as they may be smaller.

Secondly, the surface area of the final unit in principle determines the height and width of the whole deflection device (its length is determined by the number of units used), and these dimensions must as small as possible for obtaining a device handy in operation.

In addition, with a digital deflection device, the distance between two image points, (and hence the angle of deflection determined by a unit) is determined by the prisms used, that is to say this distance is fixed and not determined by the voltages applied, so that it may be chosen to be arbitrarily small.

Assuming that said distance is only 2 microns, then with approximately 1000 image points, in each direction, the total dimension of the deflected image is no larger than 3 mm. × 3 mm.

It will be evident that this final dimension is sufficiently small to construct an handy deflection device.

An experimental arrangement comprising 20 units (10 for the horizontal and 10 for the vertical direction of deflection) has the following dimensions: length 40 cms.

height 5 cms.

width 5 cms.

The dimensions of 5 cm. × 5 cm. are much larger than the final dimensions of approximately 3 mm. × 3 mm. of the deflected image so that this image readily falls within the surface area of the final unit.

The image of approximately 3 mm. × 3 mm. is enlarged, for example, 1000 times by the magnifying lens. Thus, the projected image is 3 m. × 3 m. having image points of approximately 1 mm. with spacings of approximately 2 mms.

Since the laser light ray has a very high intensity, the projected image has sufficient brightness despite the 1,000 -fold enlargement.

Further, it should be noted that, for controlling the luminosity of the laser ray, it is advantageous to use an electrically controllable polarizer if a digital deflection device is employed. In fact, the laser ray fed into such a deflection device must be polarized. The controllable polarizer now provides not only for the variations in luminosity, but also provides light which is polarized in the desired direction.

In order that the invention may be readily carried into effect, it will now be described in detail, by way of example, with reference to the accompanying diagrammatic drawings, in which.

Figure 3:
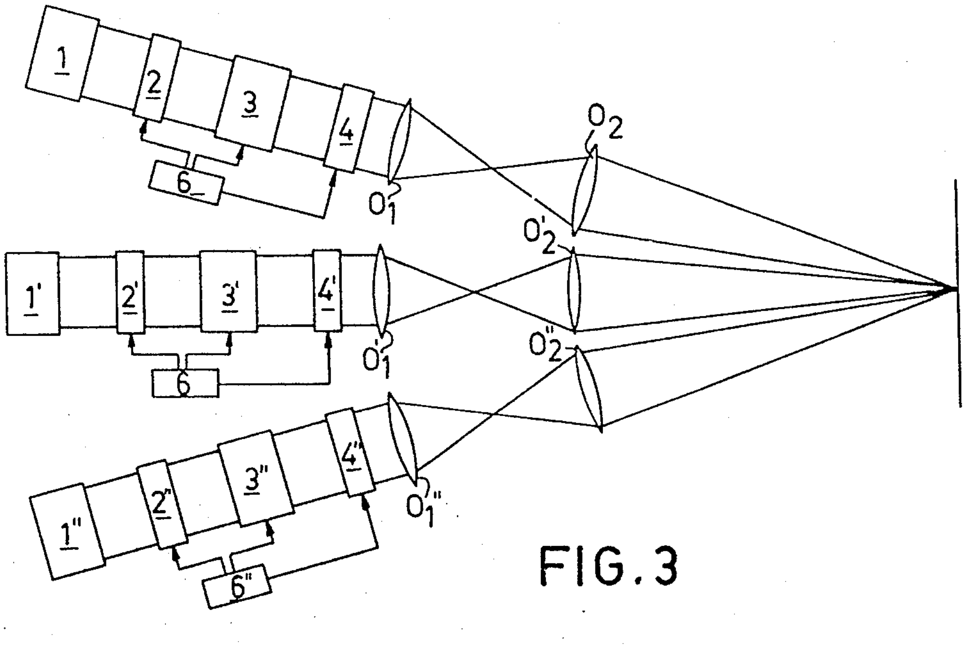
Figure 4:
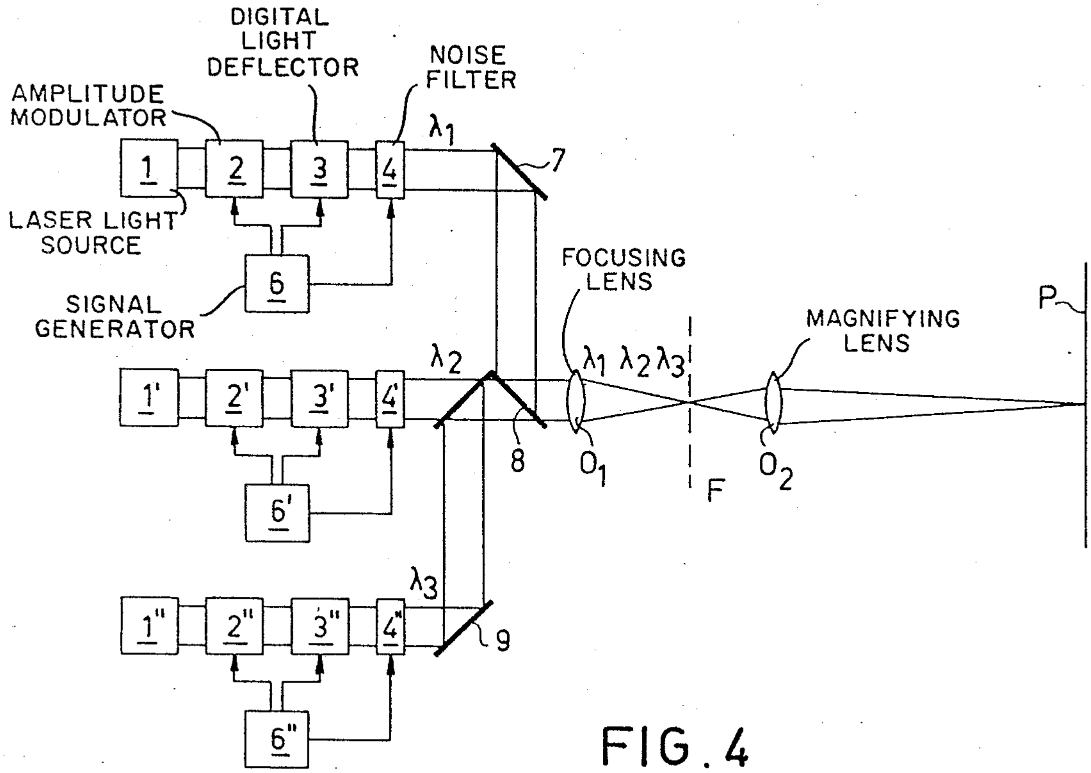
Figure 5:
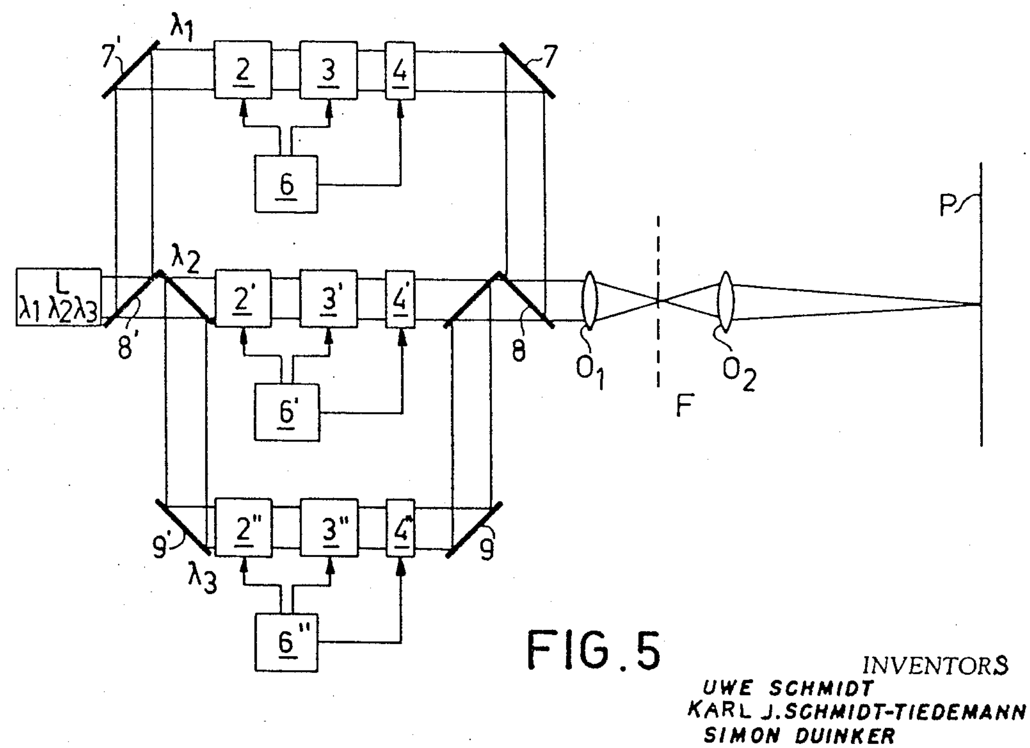
Figure 6:
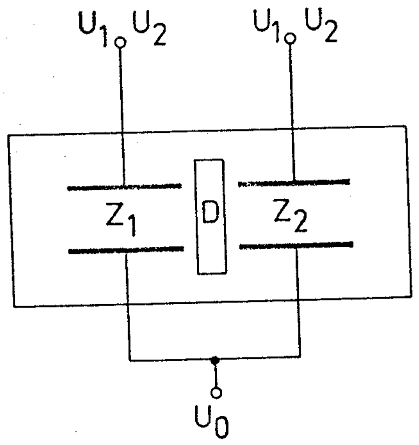
Figure 7:
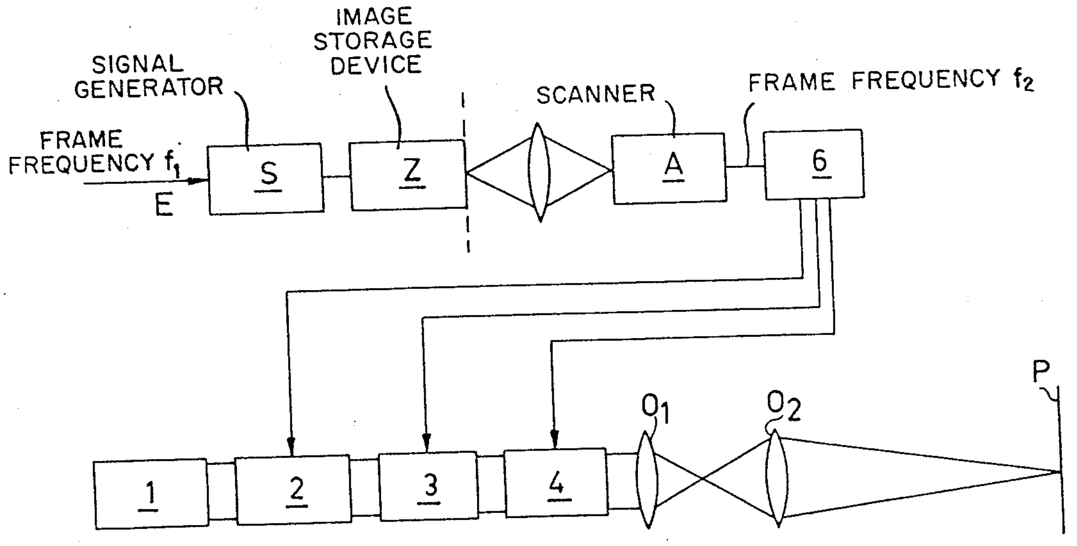
Figure 8:
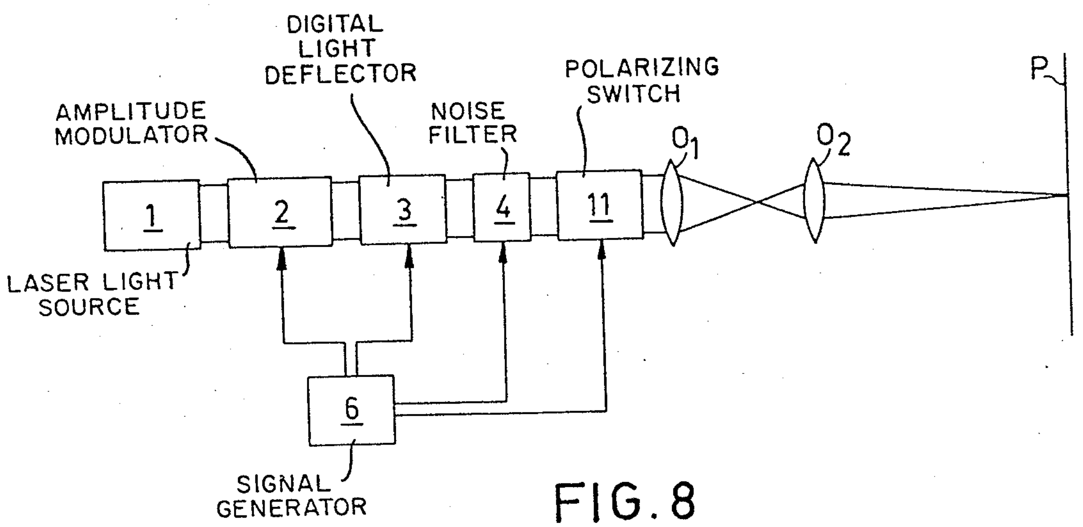
Figure 9:
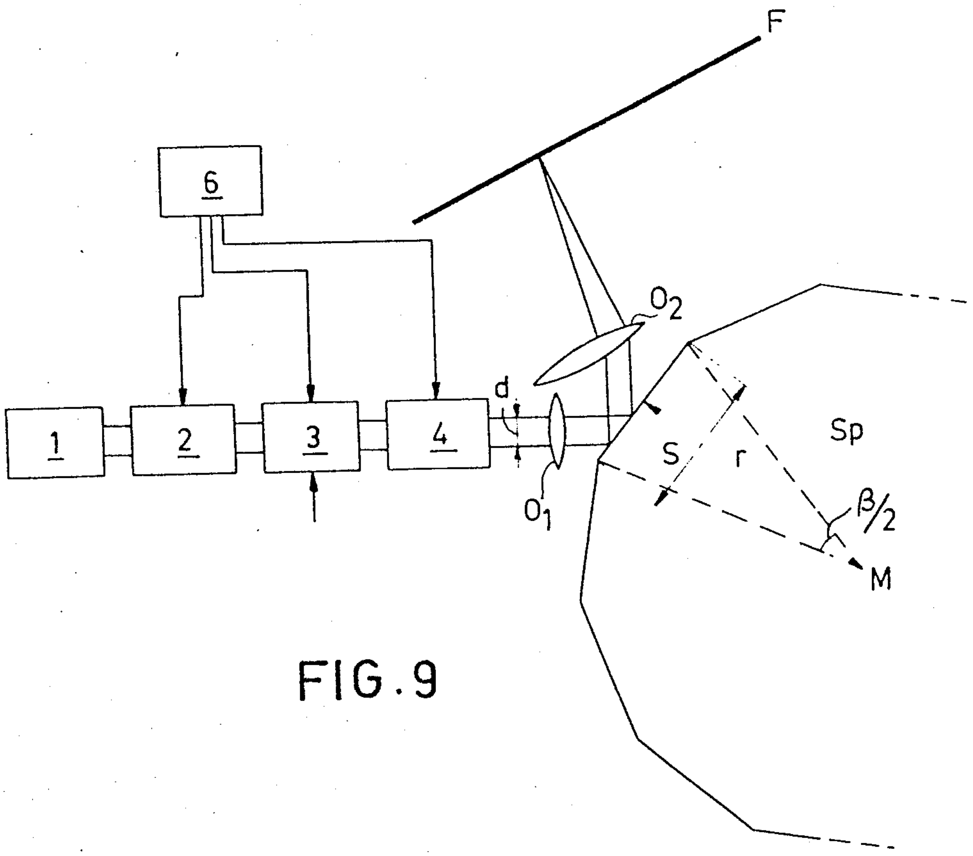

FIGS. 3, 4, and 5 show further embodiments of multicolor projection devices;

FIG. 6 shows a achromatic Kerr-cell;

FIG. 7 shows a projection device having a converter of frame frequency;

FIG. 8 shows a projection device having a polarizing switch;

FIG. 9 shows a projection device having a mirror wheel.

Figure 1:
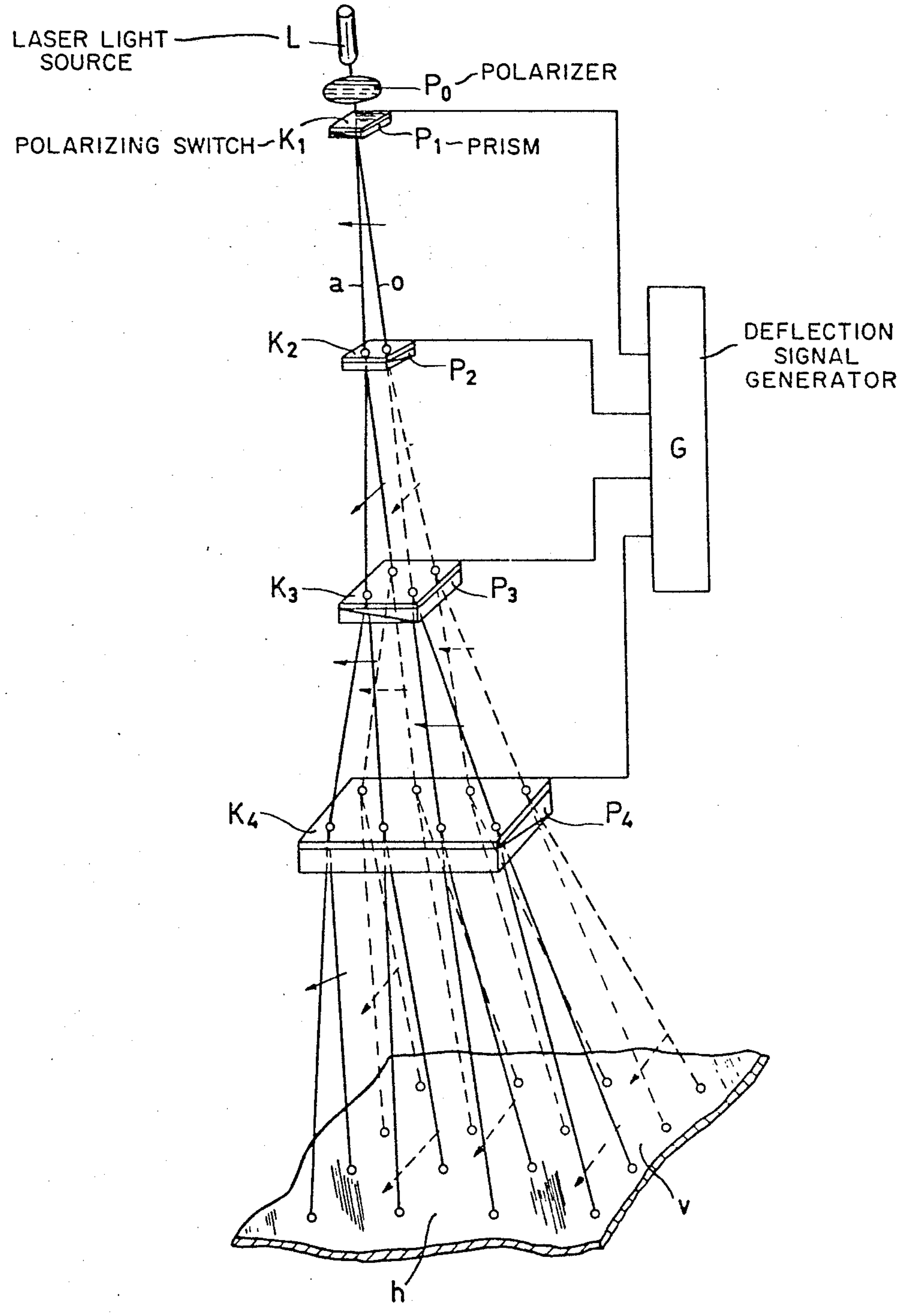
FIG. 1 shows the digital deflection device known from British Pat. Specification No. 994,955.

A digital light deflector as shown in FIG. 1 permits a light ray to be deflected by a certain angle and this only in steps, that is to say intermediate angles are impossible. According to FIG. 1 such a light deflector preferably comprises a laser light source L of which the collimated light ray polarized by Postrikes a polarizing switch $K_1$, for example a Kerr-cell, which permits the state of polarization of the incident ray to be varied by 90° so that the next following prism $P_1$ of birefractive material provides either the ordinary ray *0*, which is slightly deflected to one side, or the extraordinary ray *a* which is slightly deflected to the other side. Each of these rays is again received by a polarizing switch $K_2$ and fed to a further prism $P_2$ so that now four different directions of the ray are possible as a function of the state of the polarizing switches. The direction of deflection being determined only by the superposition of the two components constituting a prism.

Thus, the units $P_1$, $K_1$ and $P_3$, $K_3$ provide for deflection in the vertical direction *v* and the units $K_2$, $P_2$ and $K_4$, $P_4$ provide for deflection in the horizontal direction *h*.

By means of a controllable generator G corresponding voltages are to be applied to the Kerr-cells $K_1$, $K_2$, $K_3$, $K_4$ which serve as polarizing switches. The light ray is branched as it were in cascadelike manner. With the two units for each direction as used in FIG. 1 it is possible to write $2^2 = 4$ image points in one direction, resulting in an ultimate deflected image of 4 × 4 image points, as shown in the surface E in FIG. 1.

With nine arrangements of Kerr-cells and birefractive prisms, for example, $2^9$ discrete positions of the light ray along a horizontal line *h* or a vertical line *v* are possible. For two-dimensional deflections a series of Kerr-cells and birefractive prisms is needed for the horizontal and another for the vertical deflection, of which, as may be seen from FIG. 1, a horizontal and vertical deflection element may alternatively be arranged one after the other. With 18 deflectors it is possible to produce, for example, $2^{18} \approx 250,000$ light points on a quadratic surface. To obtain a deflection of the ordinary and extraordinary rays which is symmetrical with the optical axis, the prisms of birefractive material, for example, may be combined in known manner with corresponding prisms of isotropic material or suitable oriented birefractive material.

Figure 2:
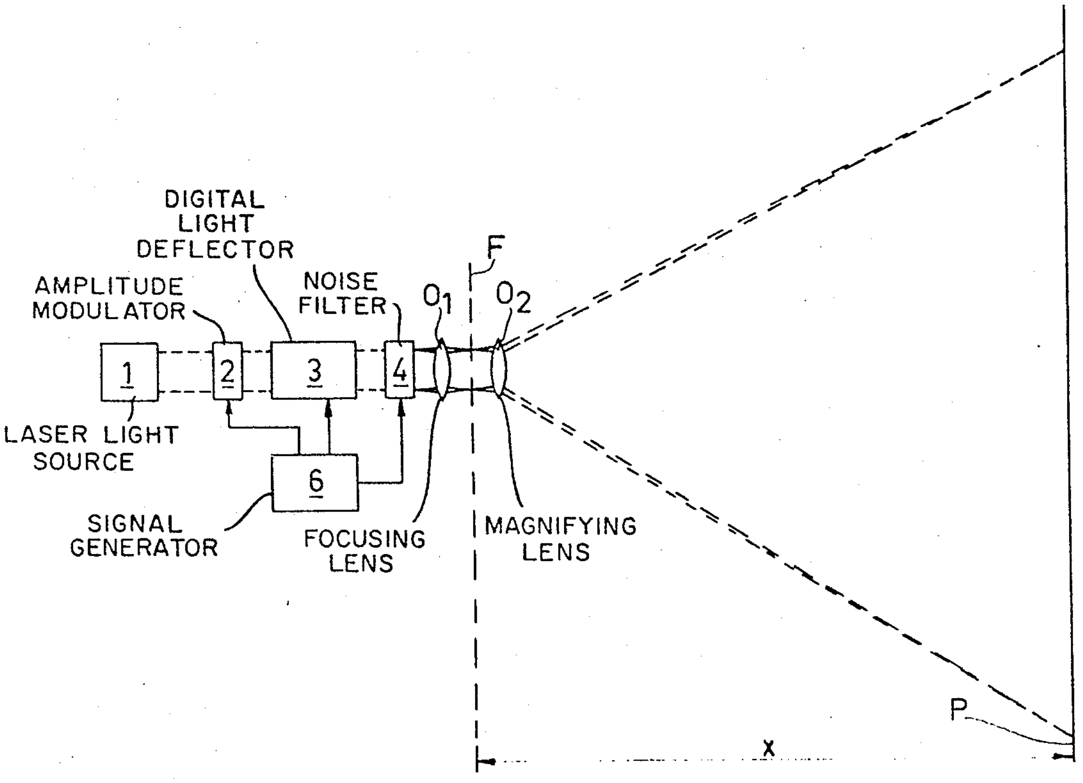
FIG. 2 shows a monochromatic projection device according to the invention.

A diagrammatic view of a device for the projection of images variable in time is shown in FIG. 2. The collimated ray of a laser light source 1 first passes through an amplitude modulator 2 based on the Kerr-effect, which is controlled by a signal generator 6 or a signal receiver. The signal generator 6 provides also the control signals for a digital light deflector 3 through which the laser ray subsequently passes. The signal generator 6 includes a generator G as shown in FIG. 1. A lens $O_1$ focuses the collimated laser light ray in the focal plane F into a point having a diameter $d$ which is determined by the equation $d \approx \lambda / D f$ where $\lambda$ is the wavelength of the light, D the diameter of the collimated laser ray and $f$ the focal length of the lens $o_1$. The variation of the direction of propagation in the light deflector causes a corresponding variation in the position of said point in the focal plane F. The movement of the point may be unidimensional or two-dimensional. The movement may even have a three-dimensional character if a digital light deflector of variable focus is used.

To suppress an undesirable underground which, under certain conditions, occurs due to the aberrations produced in the system, it is possible to interpose an optical noise filter 4, which is likewise controlled by the signal generator 6, between the digital light deflector 3 and the lens $O_1$. This noise filter operates as follows: As may be seen in from FIG. 1, the direction of polarization of the laser ray is rotated by 90° or not by one or more of the polarizing switches $K_1$ to $K_4$ dependent upon whether a voltage is applied to the relevant switches or not by the generator G. However, it is possible that said rotation is a little less or more than 90° by varying the (pulsatory) control voltage. The resulting direction of polarization may be divided into two directions, namely one which exactly corresponds to the desired rotation of 90° and thus provides the larger vector and an undesirable direction which is at right angles thereto and provides the smaller vector.

The birefractive prism $P_x$ which belongs to the unit the polarizing switch $K_x$ of which is fed with the control voltage which is too large or too small thus provides a first desirable light ray (the large vector) of high intensity which is deflected by a first angle by the prism $P_x$ (this first angle is determined by that refraction index of the birefractive material which belongs to the direction of polarization of the large vector), and a second, undesirable light ray (the small vector) of lower intensity which is deflected by a second angle by the prism $P_x$ (this second angle is determined by the remaining index of refraction).

In order to eliminate this undesirable second light ray, which is to be regarded as noise, the noise switch 4 comprises a polarizing switch and an analyzer. The analyzer only transmits light of a certain direction of polarization. The polarizing switch of noise filter 4 is controlled by the signal generator 6, which also controls the deflection device 3, so that the light ray of high intensity always has the direction of polarization which is transmitted by the analyzer of filter 4. It will be evident that the light ray of low intensity then has a direction, which yet differs by 90° from that of the light ray of high intensity, which is not transmitted by the analyzer.

The time-variable image produced in the focal plane F of the lens $o_1$ cannot be viewed directly, as previously stated, since it is very small. However, according to the invention, the image is enlarged by means of a second lens $Q_2$ and only then projected onto the projection screen P, as shown diagrammatically in FIG. 2.

It is possible to bring a photographic film instead of a projection screen in the focal plane $p$. When the film is moved correspondingly, the time variable images produced may then be arrested on it as individual images similarly as in a cinema film.

The radiation of a laser is monochromatic by mature insofar only two energy terms of the excited material are concerned. Consequently, the time variable image as referred to hitherto is also monochromatic. However, for direct viewing with the eye a monochromatic image (that is to say, for example, red, green or blue) is usually undesirable. The image should either by monochromatic in the sense of black-and-white or multicolored. The simplest method of obtaining such a multicolor projection is shown diagrammatically in FIG. 3.

Three time variable images are produced and subsequently caused, by suitable passive optical systems $O_1$ ....$O''_1$, $0_2$.... $0''_2$, to overlap in the desired image area P by means of three projection apparatus such as have already been described for the monochromatic case with reference to FIG. 2 and the parts of which are indicated in FIG. 3 by reference numerals provided with brackets. The laser source 1....1'' emit light of different wavelengths. The choice of these wavelengths is in principle wholly arbitrary and may be matched to the prevailing requirements. It would now be desirable to reduce the number of the active and passive optical components used for producing a multicolor image. Several possibilities in this direction are given hereinafter;

1. Instead of using projection lenses $O_1$ ....$O''_1$ and $O_2$....$O''_2$, it is possible to employ in the usual manner an arrangement of dichroic elements 7, 8, 9 such as shown, for example in FIG. 4, and lenses $O_1$ and $O_2$ for focusing in the focal plane F and for enlarging respectively. The arrangement 8 in this example a dichroic radiation divider. Not only is the number of projection lenses thus reduced but also the occurrence of a parallax error is avoided.

2 With a single laser material it is fundamentally possible for a plurality of pairs of terms to be brought simultaneously to laser action so that, in principle, one laser light source permits of producing simultaneously two or more laser radiation of different frequencies $\lambda_1$, $\lambda_2$, $\lambda_3$. Thus an arrangement as shown in FIG. 5 is made possible in which the multifrequency laser light source is designated L and the corresponding dichroic elements are designated 7' .... 9'. A reduction in the number of the digital light deflectors in the first instance encounters difficulties since, firstly, the refractive indices of the birefractive deflection prisms exhibit a considerable dispersion and, secondly, also the Kerr constant (or Pockel constant) to the polarizing switch exhibits a considerable dependency upon wavelength. The dispersion which occurs with the birefractive prisms is important especially if the deflection system has a high resolution.

It it is found necessary to compensate for the dispersion of the refractive-index difference $\Delta n$ it is possible to use the following method for correction. A variation of the expression $\Delta n$ with the wavelength $\lambda$ causes the spacing, $n$ between two image points projected in the focal plane F to vary with the wavelength $\lambda$. Also the lenses $O_1$ and $O_2$ will vary their focal lengths $f_1$ and $f_2$ with the wavelength $\lambda$ if not corrected as achromates. If the raster spacing $r$ varies by the amount $\Delta r$ the lens $O_2$ must be corrected so that the relationship $\Delta r/r = -\Delta g/g$ ($g$ = object distance for lens $O_2$) is fulfilled in order that the size of the raster on the projection screen remains independent of the variation in wavelength. Accordingly the variation of the focal length $f_1$ with wavelength must be chosen so that $\Delta f_1 = -\Delta_g$. The dispersion of the focal length $f_1$ is found from the differential equation:

$$\frac{d(1_1 f_1)}{d\lambda} = -\frac{d(1_1 \Delta n)}{d\lambda}(A - f_1)/A$$

wherein A is the distance between the lenses $O_1$ and $O_2$. The dispersion of the focal length $f_2$ then follows from the equation.

$$f_2 = \frac{(A - f_1)b}{b - A + f_1}$$

where $b$ is the distance between the lens $O_2$ and the plane of projection P. The conditions given by the specified equations may nearly always be obtained by suitable choice of the glasses used in the lenses and the construction of the lenses. When the dispersion of $\delta n$ has thus been compensated for two wavelengths, for example, in the blue and red, the compensation is also automatically obtained for all the wavelengths located therebetween since all the magnitudes concerned are assumed to vary linearly with $\lambda$.

When the dispersion originating from the prisms is compensated by the lenses $O_1$ and $O_2$ there remains the dispersion of the polarizing switch. It is then possible to work with only one deflection device 3 if the three light-frequencies are passed through the system 2, 3, 4, in time sequence. The dichroic mirrors and also the systems 2′, 3′, 4′ and 2″, 3″, 4″ may then be dispensed with. The dispersion of the Kerr constant of a polarizing switch equipped with a Kerr-cell may then readily be compensated for. If the plane of polarization should be rotated by 90° with one and the same Kerr-cell, that is to say at three different light frequencies, the voltage must in general be varied between six different working points. The number of the different voltages may be reduced by suitable choice of the three light frequencies and the working points. In the case of three working points, it has been found preferable to divide the one cell hitherto present in the Kerr-cell into two cells $Z_1$ and $Z_2$ which are separated by a dielectric D of a low constant, as shown diagrammatically in FIG. 6. The two partial Kerr-cells $Z_1$ and $Z_2$ may then be activated independently of each other, each partial Kerr-cell having to be fed with a value of $U_0$ and pulses of only one voltage height $U_1$ and $U_2$ respectively. If more working points are used it is necessary to carry out correspondingly more subdivisions of the Kerr-cell. Summarizing the foregoing, rotation is dependent upon voltage. For three different wavelengths; rotation is accomplished by applying two different voltages for each frequency. The two voltages act upon each frequency to accomplish the rotation. If one working point is established at zero, and levels are designed to coincide, only three working points are needed for rotation of three frequencies. As shown in FIG. 6, partial rotation is accomplished in a dual cell arrangement. Each cell receives the respective two level voltages $U_1$ and $U_2$. Thus, at the first level, each cell receives a $U_1$ voltage and then a $U_2$ voltage.

The described technical details for the multicolor projection of time variable images do not pretend to be complete with regard to combination of the partial equipments shown individually. It is also possible, for example, when using only one light deflector and one projection system for the various wavelengths of the light, to employ a number of laser light sources which corresponds to the number of wavelengths of the light, and to combine the radiations from the individual light sources through dichroic elements. It is naturally also possible for the image produced by the lens $O_2$ to be varied in size to a certain extent by means of a further lens, a Zoom lens, without changing the distance of projection. With suitable construction it is also possible to combine the lens $O_2$ and the Zoom lens to form one system.

As a matter of fact, the production of a three-color image also permits of obtaining with the same device a black-and-white image as a special case of the three-color image. A further and simpler method of the black-and-white projection consists in projecting a monochromatic image on a phosphorus screen by using an arrangement as shown in FIG. 2. If the wavelength of the laser radiation lies in a suitable region, for example in the blue or ultraviolet, and if the phosphorus has a suitable quality, the blue or violet image may be changed by the phosphorus to a black-and-white image in the usual manner.

If the frame frequency of the signal controlling the projector is so low that the image produced flickers when viewed by the human eye, it is possible artificially to increase the frame frequency $f_1$ by means of an intermediate image. FIG. 7 shows diagrammatically that the original picture signal fed into E and controlled through the signal generator S is first used for producing an intermediate image in Z. This intermediate image should have the property that the light intensity radiated from each image point has a duration equal to the time constant of the frame frequency. Such an image of long duration is preferably produced with the air of a phosphorus which is excited either by the known technique by means of an electron ray modulated by the signal $f_1$, or by means of a laser ray modulated in direction and intensity. Within the scope of known technique it causes no fundamental difficulties to choose a phosphorus the decay constant of which is equal to the time constant $\tau$ of the frame frequency. This quasicontinuous intermediate image may be scanned with the required frame frequency of $f_2$ during the period $\tau$ by means of a digital picture scanning device or by means of a picture scanning device A which operates on the principles of known television cameras. The picture signal provided by the picture scanning device A may be handled further in the manner above described for the purpose of a digital image projection, the reference numerals of the further parts corresponding to those of FIG. 2.

The digital image projection permits of producing stereoscopic images on a polarization-optical basis in a very simple manner. The sole modification to be made to conventional arrangements consists in that the digital light deflector 3 or- if available optical noise filter 4 must be followed by a further polarization optical switch 11 (for example Kerr-cell, Pockel-cell, etc.) as shown by way of example in FIG. 8. Since the light emerging from the digital light deflector 3 or the optical noise filter 4 has already been polarized linearly, it causes no difficulty to operate the polarizing switch 11 so that the images produced are alternately polarized linearly and at right angles to one another. If the viewer, according to the known technique, wears a pair of polarizing spectacles and if the picture signals fed into the digital projector have a corresponding modulation, the viewer has a three-dimensional impression of the images produced. The mechanism described is independent of whether the images are monochromatic or multicolored.

The stereoscopic projection of images may also be obtained if, by means of a digital dichroic projector, two images of different colors are produced — either alternately or simultaneously dependent upon the kind of projector — which are seen by a viewer, according to the known technique, with a pair of spectacles each glass of which is permeable to only one of the colors. Since the two colors are monochromatic by the nature of the laser radiation, the separation of the two images by means of the filter glasses is considerably simplified relative to conventional methods of projection. Because of the monochromatic character of the laser radiation the two colors need not differ with regard to their wavelengths so much that they appear to the eye as different colors. From this results as a further conclusion that a three-dimensional multicolor projection is also possible when viewing with colored spectacles. In this case, alternating images will be produced of which one image contains the wavelengths $\lambda_1$, $\lambda_2$, .. and the other image contains the wavelengths $\lambda'_1$ $\lambda'_2$, ..the wavelength $\lambda_1$ and $\lambda'_2$, (accordingly $\lambda_2$ and $\lambda'_2$, etc.) not being distinguishable for the eye.

The images of the two stereoscopic methods of projection are seen as two-dimensional by the naked eye when the two partial images at the place or projection or the place of viewing overlap. A further possibility of producing time-variable images is obtained by the combination of a linear digital light deflector and electromechanical deflection mechanisms, Assuming, for example, that the available picture signal gives the values for the image points to be produced in singular sequence, it is possible to scan a line, for example, by means of a digital light deflector and to effect the much slower line scan, for example, by means of a rotary mirror $S_p$ (FIG. 9). The focal plane F of the lens $O_1$ then exactly coincides with the surface of a part (diameter $S_n$) of the rotary mirror $S_p$. As before, the lens $O_2$ enlarges the deflected image.

The following consideration shows that the technical requirements then to be imposed upon the rotary mirror Sp decidedly remain within the scope of the actual technique. Assuming that the laser ray to be deflected has a diameter $d$ and that it should be deflected in N—different directions, the total change of direction which it undergoes through the mirror Sp must be N times the angular divergence $\alpha$ of the laser ray. With a laser excited in the fundamental mode we have $a \approx \lambda/d$. Thus, for the total angle of scanning we have $\beta = N \lambda / d$. For producing this angle of deflection the mirror Sp must be rotated by the angle $\beta/2$. If the mirror is at a distance $r$ from the center of rotation M and also has a diameter S$n$ in the direction of rotation, we further have $\beta/2 = Sn/r$, ($Sn/r << 1$It is now still necessary that the diameter $d$ of the laser ray is small relative to the diameter S$n$ of the mirror in order that the intensity is attenuated only close to the edge of the image to be scanned. The time interval in which the laser ray just impinges on two mirrors will preferably not be used for scanning the image to be produced. Consequently, if the coefficient is determined as $a = d/Sh$, we have $N\lambda / 2d = d/ar$ or $r = 2d^2/aN\lambda$. To explain this, the following numerical example may serve: $d = 0.1$. $N = 10^3$, $\lambda = 5 \times 10^15$ cm. Then $r = 4$ cm. 24 mirrors each $Sn = 1$ cm. in diameter can be arranged on a mirror wheel of $r = 4$ cm. Assuming that the frame frequency is 30 sec. [11], the rotary mirror must perform $30/24 = 1.25$ revolutions per second.

We claim:

1. A laser imaging system comprising a laser light source producing a beam of light in time successive multiple frequencies, a digital voltage controllable deflection device including a plurality of partial cells separated by a dielectric, each of said cells being separately voltage controllable between two levels of voltages for each frequency, the number of cells corresponding to the number of pairs of voltage levels employed to rotate the successive light beam frequencies emerging in time succession from said laser light source, said deflection device positioned in said beam and dividing said beam into a plurality of individual horizontally and vertically deflectable image points, a voltage controllable polarization device positioned in said beam between said deflection device and said laser light source for controlling the brightness of the image points, a first lens arranged in the beam at the emergence of the light from said digital deflection device for focusing said beam into a first focal plane, and a second magnifying lens for focusing the beam emerging from said first focal plane into a second focal plane.

2. A laser imaging system comprising a laser light source producing a multiple frequency beam of light, a digital voltage controllable deflection device positioned in said beam and dividing said beam into a plurality of individual horizontally and vertically deflectable image points, a voltage controllable polarization device positioned in said beam between said deflection device and said laser light source for controlling the brightness of the image points, a first lens arranged in the beam at the emergence of the light from said digital deflection device for focusing said beam into a first focal plane, and a second lens for focusing the beam emerging from said first focal plane into a second focal plane, said digital deflection device including means compensating dispersion phenomena produced by said first and second lens over the range of laser light frequencies.

3. A device as claimed in claim 2, wherein said polarizer employed for the control of the brightness of each said beam is constituted by a Kerr-cell.

4. A device as claimed in claim 2 wherein a phosphorus screen is placed in said second focal plane.

5. A device as claimed in claim 2 wherein a multimchrome and multifrequency laser light source is used, a first set of dichroic mirrors being arranged between said light source and the polarizers of the three devices, and a second set of dichroic mirrors between the deflection arrangement and the first lens.

6. An optical device comprising three laser imaging systems each having digitally controlled light deflectors and polarizers for producing superimposed images, each of said laser imaging systems comprising a laser light source producing a multiple frequency beam of light, a digital voltage controllable deflection device positioned in said beam and dividing said beam into a plurality of individual horizontally and vertically deflectable image points, a voltage controllable polarization device positioned in said beam between said deflection device and said laser light source for controlling the brightness of the image points, a first lens arranged in the beam at the emergence of the light from said digital deflection device for focusing said beam into a first focal point plane, and a second lens for focusing the beam emerging from said first focal plane and into a second focal plane, said digital deflection device including means compensating dispersion phenomena produced by said first and second lens over the range of laser light frequencies, said second focal plane common to all three systems.

7. A device as claimed in claim 6, for producing colored images, the light rays deflected by the three devices having different wavelengths ($\lambda 1$, $\lambda 2$, $\lambda 3$), the light rays emerging from the three devices being superimposed by arranging a set of dichroic mirrors between the deflection arrangements of the three devices and the first lens.

8. A device as claimed in claim 6, further comprising an auxiliary device for storing an intermediate image of the incoming signal, means for scanning the stored intermediate image, said scanning means providing a compensating flicker frequency signal which is supplied to both the intensity modulator as well as the digital deflection device, whereby the image imposed on the screen is at a frame frequency such that flicker is not observed by the human eye.

9. A device as claimed in claim 6 wherein a further polarizing switch is arranged between the digital light deflector and the first lens, said polarizing switch being operated alternately, thereby providing images polarized linearly and images polarized relatively perpendicularly, sad images providing a three-dimensional display.

PO-1050
(5/69)

UNITED STATES PATENT OFFICE
CERTIFICATE OF CORRECTION

Patent No. 3,569,988 Dated March 9, 1971

Inventor(s) Uwe Schmidt et al

It is certified that error appears in the above-identified patent and that said Letters Patent are hereby corrected as shown below:

Col. 1, line 44, "1,1024" should be --1,024--;

Col. 1, line 65, after "must" insert --be--;

Col. 2, line 2, "an" should be --a--;

Col. 2, line 5, cancel "length"

line 6, before "40 cms." insert --length--;

line 47, "Pos-" should be --Po--;

line 48, "trikes" should be --strikes--;

line 56, after "switches" cancel ". The" and insert --, the--;

Col. 3, line 22, "$o_1$" should be --$O_1$--;

line 33, cancel "in";

line 68, "$o_1$" should be --$O_1$--;

line 70, "$Q_2$" should be --$O_2$--;

Col. 4, line 4, "mature" should be --nature--;

line 10, "by" should be --be--;

line 31, after "8" insert --is--;

line 46, "to" should be --of--;

line 51, "It" should be --If--;

PO-1050
(5/69)

UNITED STATES PATENT OFFICE
CERTIFICATE OF CORRECTION

Page 2

Patent No. 3,569,988 Dated March 9, 1971

Inventor(s) Uwe Schmidt et al

It is certified that error appears in the above-identified patent and that said Letters Patent are hereby corrected as shown below:

Col. 5, line 5, cancel "$\delta$n" and insert --$\Delta$n--;

Col. 6, line 5, "air" should be --aid--;

line 58, "$\lambda'_2$" should be --$\lambda'_1$--;

line 63, "or" (1st occurence) should be --of--;

Col. 7, line 13, after "l" insert --). --;

line 20, "d/Sh" should be --d/Sn--;

line 22, "$10^15$" should be --$10^{-5}$--;

line 25, "sec. $^{11}$" should be --sec. $^{-1}$--;

IN THE CLAIMS

Claim 1, line 17, cancel "magnifying"

line 18, before "focusing" insert --magnifying an

Claim 5, line 1, "multimchrome" should be --multi-chrome-

Claim 6, line 13, delete --point--.

Signed and sealed this 5th day of September 1972.

(SEAL)
Attest:

EDWARD M.FLETCHER,JR.
Attesting Officer

ROBERT GOTTSCHALK
Commissioner of Pate